US008994708B2

(12) United States Patent
Lin et al.

(10) Patent No.: US 8,994,708 B2
(45) Date of Patent: Mar. 31, 2015

(54) DRIVER CIRCUIT FOR DOT INVERSION OF LIQUID CRYSTALS

(71) Applicant: Sitronix Technology Corp., Hsinchu County (TW)

(72) Inventors: Tsun-Sen Lin, Hsinchu County (TW); Cheng-Chung Yeh, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 14/105,503

(22) Filed: Dec. 13, 2013

(65) Prior Publication Data

US 2014/0098080 A1 Apr. 10, 2014

Related U.S. Application Data

(63) Continuation-in-part of application No. 12/792,179, filed on Jun. 2, 2010.

(30) Foreign Application Priority Data

Jun. 2, 2009 (TW) .............................. 98118189 A

(51) Int. Cl.
*G06F 3/038* (2013.01)
*G09G 3/36* (2006.01)

(52) U.S. Cl.
CPC ........... *G09G 3/3614* (2013.01); *G09G 3/3696* (2013.01)
USPC ........................................... 345/209; 345/96

(58) Field of Classification Search
USPC ........................................................... 345/96
See application file for complete search history.

(56) References Cited

U.S. PATENT DOCUMENTS

2006/0139282 A1* 6/2006 Gotou ............................. 345/96
2009/0153225 A1* 6/2009 Nakahara ...................... 327/419

* cited by examiner

*Primary Examiner* — Robin Mishler
(74) *Attorney, Agent, or Firm* — Rosenberg, Klein & Lee

(57) ABSTRACT

A driver circuit for dot inversion of liquid crystals includes a positive source supplying a first positive signal and a second positive signal; a negative source supplying a first negative signal and a second negative signal; a first selector unit connected with the sources to receive the first positive signal and the first negative signal; a second selector unit connected with the sources to receive the second positive signal and the second negative signal; a first source connected with the selection unit to alternatively output a first positive voltage and a first negative voltage; a second source connected with the selection unit to alternatively output a second positive voltage and a second negative voltage. When the first source outputs the first positive voltage, the second source outputs the second negative voltage. When the first source outputs the first negative voltage, the second source outputs the second positive voltage.

10 Claims, 16 Drawing Sheets

| frame N | | source | | | | |
|---|---|---|---|---|---|---|
| | | S1 | S2 | S3 | S4 | S5 |
| gate | G1 | + | - | + | - | + |
| | G2 | - | + | - | + | - |
| | G3 | + | - | + | - | + |
| | G4 | - | + | - | + | - |
| | G5 | + | - | + | - | + |

| frame N+1 | | source | | | | |
|---|---|---|---|---|---|---|
| | | S1 | S2 | S3 | S4 | S5 |
| gate | G1 | - | + | - | + | - |
| | G2 | + | - | + | - | + |
| | G3 | - | + | - | + | - |
| | G4 | + | - | + | - | + |
| | G5 | - | + | - | + | - |

DRIVER CIRCUIT FOR DOT INVERSION OF LIQUID CRYSTALS

REFFRENCE TO RELATED APPLICATION

This Application is being filed as a Continuation-in-Part of patent application Ser. #12/792,179, filed on 2 Jun. 2010, currently pending.

FIELD OF THE INVENTION

The present invention relates to a driver circuit for dot inversion of liquid crystals. More particularly, the present invention relates to a simplified driver circuit for dot inversion of liquid crystals.

BACKGROUND OF THE INVENTION

In general, a conventional flat panel display is operated to generate pixels by controlling a series of corresponding thin film transistors (TFTs) such that a LCD display can be controlled to display predetermined images. The conventional flat panel display has a plurality of gate driving lines connected with corresponding gates of the thin film transistors so as to control on/off operation of the thin film transistor.

FIG. 1 illustrates polarity diagrams of gates of liquid-crystal capacitors (i.e. CLC) in relation to corresponding sources in two frames when the liquid-crystal capacitors are charged in dot inversion of voltage polarity switching. Referring to FIG. 1, the two frames are a first frame (identified as Frame N) and a second frame (identified as Frame N+1). By way of example, each of Frame N and Frame N+1 has a series of gates (identified as Frame G1, G2, G3, G4, G5) and a series of signal sources (identified as S1, S2, S3, S4, S5). In FIG. 1, positive and negative of polarities are identified as "+" and "−".

FIG. 2 shows conventional voltage waveforms of voltage dot inversion switching of two sources in operating dot inversion of liquid crystals. Referring to FIG. 2, the two sources (first source S1 and second source S2) are switched for dot inversion with respect to a ground line (i.e. common voltage "VCOM"), indicated by a dotted line, between a positive voltage "VP" and a negative voltage "VN" so that the corresponding liquid crystals can be dot-inverted.

In FIG. 2, a solid line represents the voltage waveform of the first source S1 while a dashed line represents the voltage waveform of the second source S2. A symbol "S1+" represents a section of the voltage waveform of the first source S1 when the voltage is positive, and a symbol "S1−" represents a section of the voltage waveform of the first source 51 when the voltage is changed to a negative and vice versa. Correspondingly, a symbol "S2−" represents a section of the voltage waveform of the second source S2 when the voltage is negative, and a symbol "S2+" represents a section of the voltage waveform of the second source S2 when the voltage is changed to a positive and vice versa.

In first dot inversion, as best shown in the left portion of FIG. 2, the voltage of the first source S1 drops from the positive voltage VP to the negative voltage VN, and the voltage of the second source S2 rises from the negative voltage VN to the positive voltage VP synchronously. Alternatively, in second dot inversion, as best shown in the middle portion of FIG. 2, the voltage of the first source S1 rises from the negative voltage VN to the positive voltage VP, and the voltage of the second source S2 drops from the positive voltage VP to the negative voltage VN synchronously. It is apparent from FIG.

2 that the voltages of the first source S1 and the second source S2 are repeatedly switched in the same manner for dot inversion of liquid crystals.

However, conventional driver circuits for dot inversion of liquid crystals are constructed from a great number of additional components or high voltage components. However, there is a need of improving a conventional driver circuit for dot inversion of liquid crystals for simplifying the entire structure, reducing dimensions and power consumption of the driver circuit.

The driver circuit for dot inversion of liquid crystals has been described in many Taiwanese patent application publications and issued patents, for example, including TWN patent appln. Pub. No. 200903428, TWN patent appln. Pub. No. 2008488448, TWN patent appln. Pub. No. 2008471168, TWN patent appln. Pub. No. 2008393648, TWN patent appln. Pub. No. 2008282148, TWN patent appln. Pub. No. 2008161268, TWN patent appln. Pub. No. 2008117968, TWN patent appln. Pub. No. 2007367768, TWN patent appln. Pub. No. 2007232328, TWN patent appln. Pub. No. 2007032218, TWN patent appln. Pub. No. 2007032228, TWN patent appln. Pub. No. 200639779, TWN patent appln. Pub. No. 2005339908, TWN patent appln. Pub. No. 2005273628, TWN patent appln. Pub. No. 2005309998, TWN patent appln. Pub. No. 2005291518, TWN patent appln. Pub. No. 2005219318, TWN patent appln. Pub. No. 2005273618, TWN patent appln. Pub. No. 2005140108, and TWN patent appln. Pub. No. 200303003; and TWN patent issued Pub. No. 1293449, TWN patent issued Pub. No. 1292901, TWN patent issued Pub. No. 1291157, TWN patent issued Pub. No. 1291160, TWN patent issued Pub. No. 1284880, TWN patent issued Pub. No. 1269257, TWN patent issued Pub. No. 1284878, TWN patent issued Pub. No. 1269259, TWN patent issued Pub. No 1253617, TWN patent issued Pub. No. 1240108, TWN patent issued Pub. No. 1224697, TWN patent issued Pub. No. 583630, TWN patent issued Pub. No. 581909, TWN patent issued Pub. No. 573291, TWN patent issued Pub. No. 71283, TWN patent issued Pub. No. 559753, TWN patent issued Pub. No. 543018, TWN patent issued Pub. No. 521241, TWN patent issued Pub. No. 525127, TWN patent issued Pub. No. 494383, TWN patent issued Pub. No. 486687, TWN patent issued Pub. No. 374861 and TWN patent issued Pub. No. 350063. Each of the above-mentioned Taiwanese patent application publications and issued patents is incorporated herein by reference for purposes including, but not limited to, indicating the background of the present invention and illustrating the state of the art.

Further, the driver circuit for dot inversion of liquid crystals has also been described in many U.S. patent application publications and issued patents, for example, including US20080297458, US20070139327, US20060187164, US20040189575, US20020084960, US20020075212, US20020050972 and US20020024482; and, U.S. Pat. Nos. 7,463,232, 7,450,102, 7,420,533, 7,079,100, 7,079,097, 6,980,186, 6,914,644, 6,891,522, 6,842,161, 6,784,866, 6,724,362, 6,593,905, 6,590,555, 6,566,643, 6,559,822, 6,549,187, 6,512,505, 6,424,328, 6,380,919, 6,320,566, 6,297,793, and 6,064,363. Each of the above-mentioned U.S. patent application publications and issued patents is incorporated herein by reference for purposes including, but not limited to, indicating the background of the present invention and illustrating the state of the art.

Yet further, the driver circuit for dot inversion of liquid crystals has also been described in many foreign patent application publications and issued patents, for example, including JP2007156382; KR20070051800, KR20040057248, KR20040048523, KR20040019708, KR20050015031, KR20050015030, KR20000007618, KR100242443, KR20030055921, KR20030055892, KR20030029698, KR20020058796, KR20020058141, KR20020052071, KR20020050040, KR20020046601 and KR20020017340. Each of the above-mentioned Intl. patent application publications and issued patents is incorporated herein by reference for purposes including, but not limited to, indicating the background of the present invention and illustrating the state of the art.

As is described in greater detail below, the present invention provides a driver circuit for dot inversion of liquid crystals. The driver circuit includes a single positive source and a single negative source to form two source-level outputs for positive and negative outputs. The driver circuit further includes selector circuits consisted of low voltage components in such a way as to mitigate and overcome the above problem.

SUMMARY

The primary objective of this invention is to provide a driver circuit for dot inversion of liquid crystals. The driver circuit includes a single positive source and a single negative source to form two source-level outputs for positive and negative outputs so that the number of operational amplifiers applied in the driver circuit can be reduced. Accordingly, the driver circuit is successful in simplifying the entire circuit, reducing dimensions and power consumption.

The secondary objective of this invention is to provide a driver circuit for dot inversion of liquid crystals. The driver circuit further includes selector circuits consisted of low voltage components so as to reduce dimensions and power consumption. Accordingly, the driver circuit is successful in reducing dimensions and power consumption.

The driver circuit for dot inversion of liquid crystals in accordance with an aspect of the present invention includes:

a positive source supplying a first positive signal and a second positive signal;

a negative source supplying a first negative signal and a second negative signal;

a first selector unit connected with the positive source and the negative source to receive the first positive signal and the first negative signal, the first selector unit consisted of low voltage components;

a second selector unit connected with the positive source and the negative source to receive the second positive signal and the second negative signal, the second selector unit consisted of low voltage components;

a first source connected with the first selector unit to alternatively output a first positive voltage and a first negative voltage; and a second source connected with the second selector unit to alternatively output a second positive voltage and a second negative voltage;

wherein when the first source outputs the first positive voltage, the second source outputs the second negative voltage; and wherein when the first source outputs the first negative voltage, the second source outputs the second positive voltage.

In a separate aspect of the present invention, the positive source includes a single operational amplifier.

In a further separate aspect of the present invention, the positive source connects with a selector circuit consisted of low voltage components.

In yet a further separate aspect of the present invention, the negative source includes a single operational amplifier.

In yet a further separate aspect of the present invention, the negative source connects with a selector circuit consisted of low voltage components.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

It is noted that a driver circuit for dot inversion of liquid crystals in accordance with the preferred embodiment of the present invention is suitable for various signal driver circuit systems of liquid crystal displays (LCDs) which are not limitative of the present invention.

Figure 3:
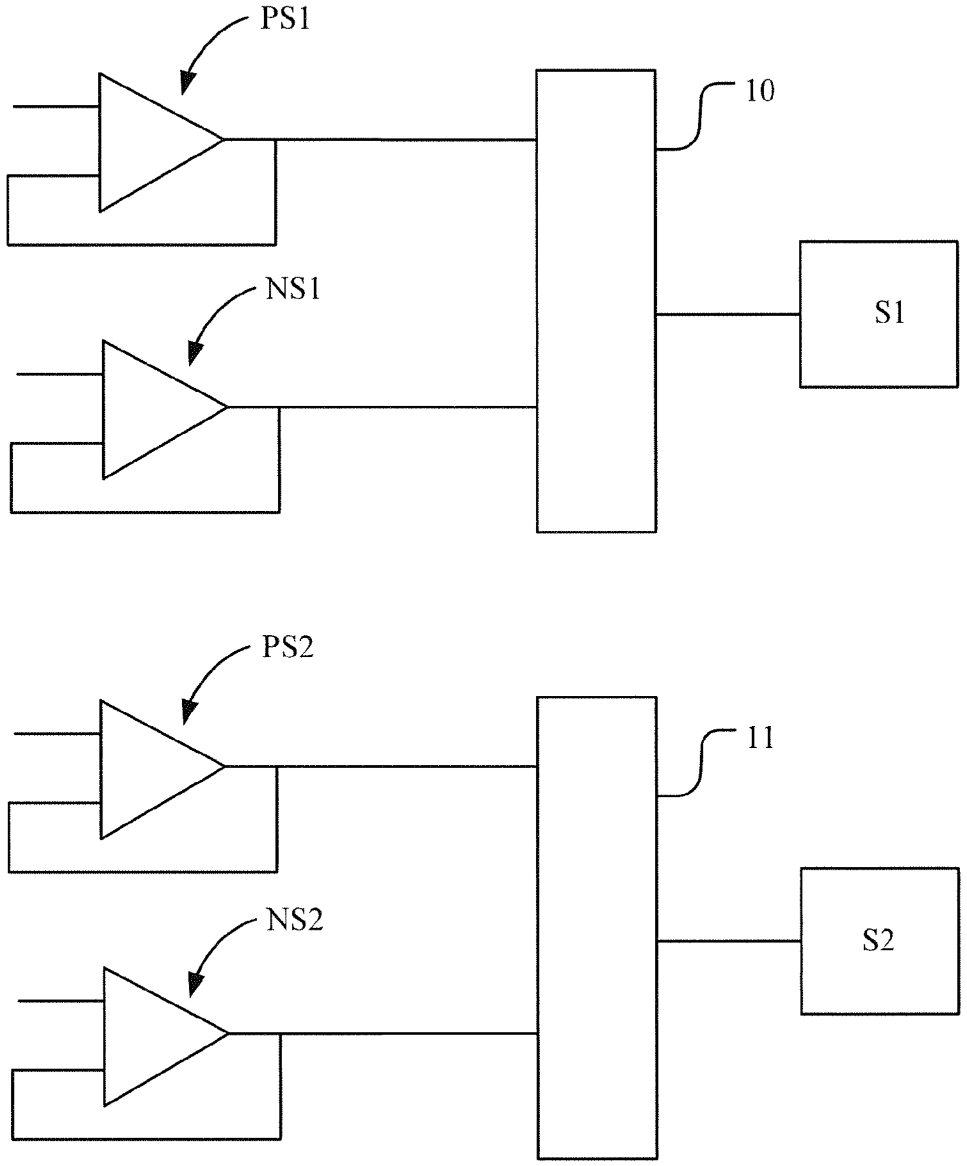
FIG. 3 is a schematic diagram of an example of a driver circuit for dot inversion of liquid crystals.
Figure 4:
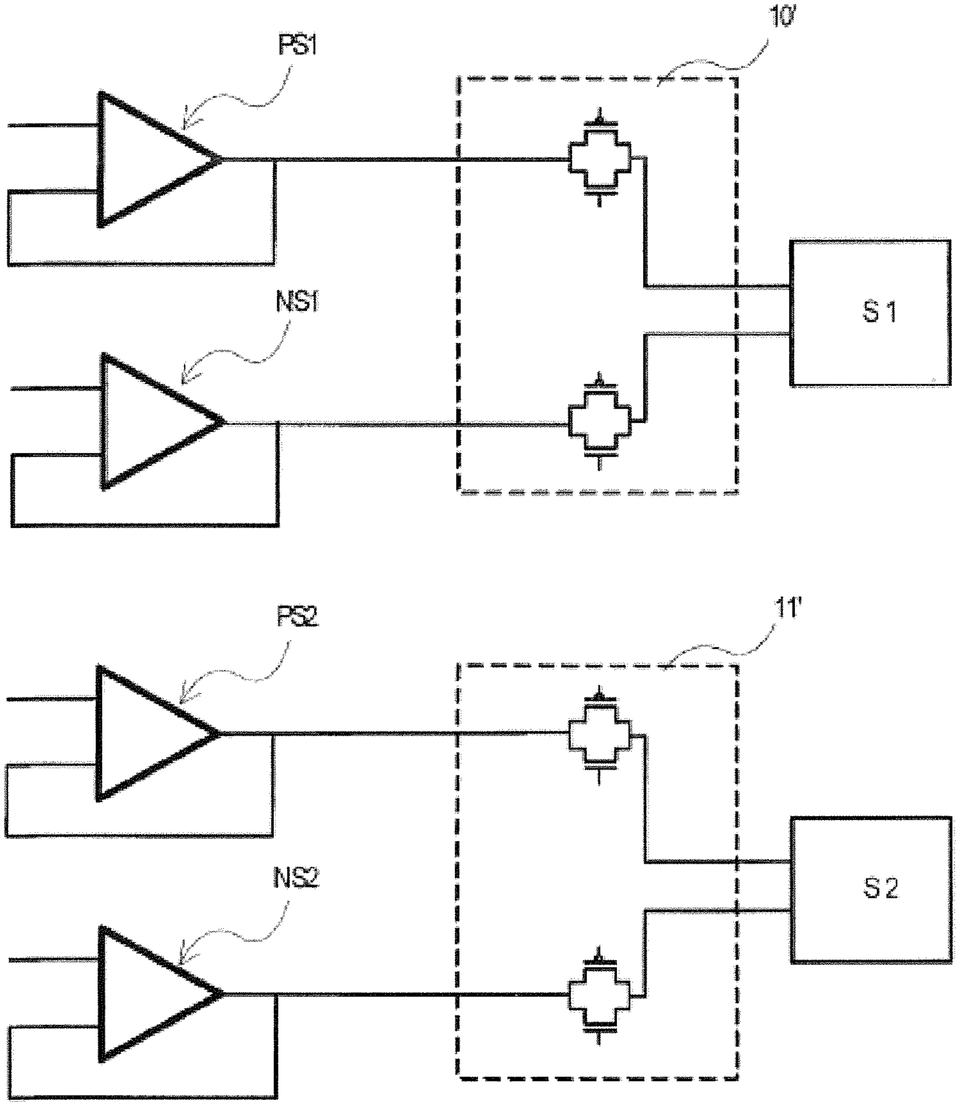
FIG. 4 is a schematic diagram of another example of a driver circuit for dot inversion of liquid crystals.

FIG. 3 illustrates a schematic diagram of an example of a driver circuit for dot inversion of liquid crystals, and FIG. 4 illustrates a schematic diagram of another example of a driver circuit for dot inversion of liquid crystals. Referring to FIGS. 3 and 4, the driver circuit has two source-level outputs connected with a first source S1 and a second source S2, respectively. The first source S1 connects with a first positive source PS1, a first negative source NS1 and a first selector 10, 10' so as to generate positive and negative voltages from the first source S1. Correspondingly, the second source S2 connects with a second positive source PS2, a second negative source NS2 and a second selector 11, 11' so as to generate positive and negative voltages from the second source S2.

As best shown in FIG. 3, the driver circuit requires at least four components of operational amplifiers due to the fact that four sources of the first positive source PS1, the first negative source NS1, the second positive source PS2 and the second negative source NS2 are provided in the driver circuit. However, the number of the operational amplifiers may increase dimensions and power consumption of the driver circuit.

Referring again to FIGS. 3 and 4, with respect to the driver circuit in FIG. 3, the driver circuit shown in FIG. 4 may include two high-voltage components of the first selector 10' and the second selector 11' which can reduce the risk of cross voltage problem. However, the high-voltage first selector 10' and the high-voltage second selector 11' have the defect of increasing dimensions and power consumption of the driver circuit.

Figure 5:
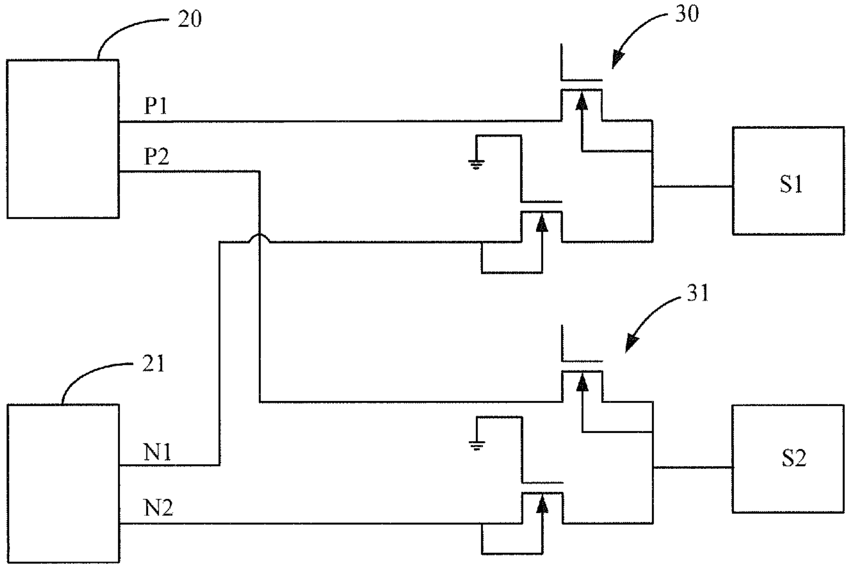
FIG. 5 is a schematic diagram of a driver circuit for dot inversion of liquid crystals in accordance with a first preferred embodiment of the present invention.

Turning now to FIG. 5, a schematic diagram of a driver circuit for dot inversion of liquid crystals in accordance with a first preferred embodiment of the present invention is shown. The driver circuit includes a positive source 20, a negative source 21, a first selector unit 30, a second selector unit 31, a first source S1 and a second source S2 which are electronically connected.

Still referring to FIG. 5, the positive source 20 is used to supply two signals, including a first positive signal (identified as "P1") and a second positive signal (identified as "P2"). Correspondingly, the negative source 21 is used to supply two signals, including a first negative signal (identified as "N1") and a second negative signal (identified as "N2").

With continued reference to FIG. 5, the first selector unit 30 connects with the positive source 20 and the negative source 21 to receive the first positive signal P1 and the first negative signal N1, and the first selector unit 30 is consisted of low voltage components so as to reduce power consumption and dimensions of the first selector unit 30. Correspondingly, the second selector unit 31 connects with the positive source 20 and the negative source 21 to receive the second positive signal P2 and the second negative signal N2, and the second selector unit 31 is consisted of low voltage components so as to reduce power consumption and dimensions of the second selector unit 31.

Figures 1, 2:
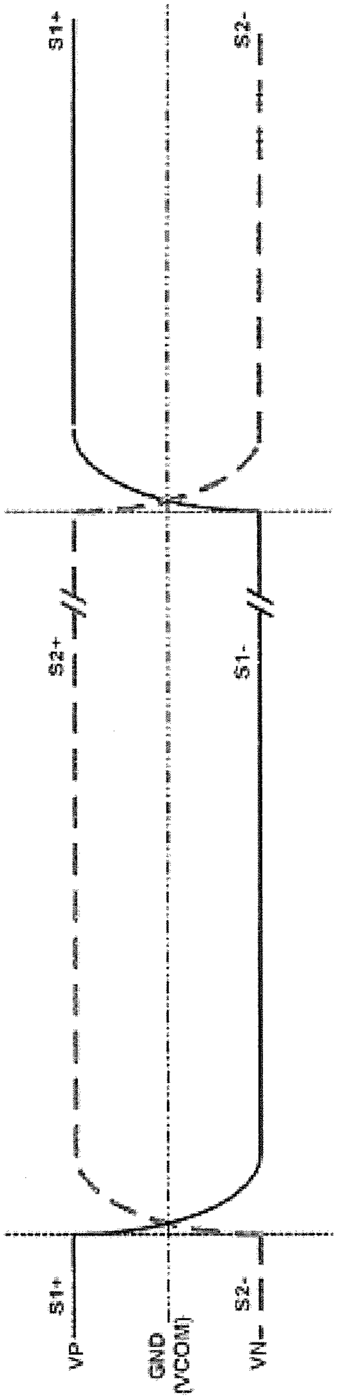
PRIOR ART FIG. 1
PRIOR ART FIG. 2
FIG. 1 is a chart of polarity diagrams of gates of liquid-crystal capacitors in relation to corresponding sources in two frames when the liquid-crystal capacitors are charged in dot inversion of voltage polarity switching in accordance with the prior art.
FIG. 2 is a series of conventional voltage waveforms of voltage dot inversion switching of two sources in operating dot inversion of liquid crystals in accordance with the prior art.

Still referring to FIG. 5, the driver circuit has two sources of signal outputs, including the first source 51 and the second source S2. The first source Si connects with the first selector unit 30 to alternatively output a first positive voltage (signal) and a first negative voltage (signal) according to outputs of the first selector unit 30, as best shown in FIG. 1. Correspondingly, the second source S2 connects with the second selector unit 31 to alternatively output a second positive voltage (signal) and a second negative voltage (signal) according to outputs of the second selector unit 31, as best shown in FIG. 1.

Still referring to FIG. 5, the signals of the positive source 20 and the negative source 21 are send to the first source S1 and the second source S2 via the first selector unit 30 and the second selector unit 31 such that the driver circuit can output drive signals for dot inversion from the first source S1 and the second source S2.

Still referring to FIG. 5, the first selector unit 30 has a control unit which is operated to control the first selector unit 30 such that the first source S1 can be controlled to output a positive signal or a negative signal. Correspondingly, the second selector unit 31 has a control unit which is operated to control the second selector unit 31 such that the second source S2 can be controlled to output a positive signal or a negative signal.

Still referring to FIG. 5, in operation, when the first source S1 outputs the first positive voltage P1, the second source S2 outputs the second negative voltage N2. Alternatively, when the first source S1 outputs the first negative voltage N1, the second source S2 outputs the second positive voltage P2.

Figure 6:
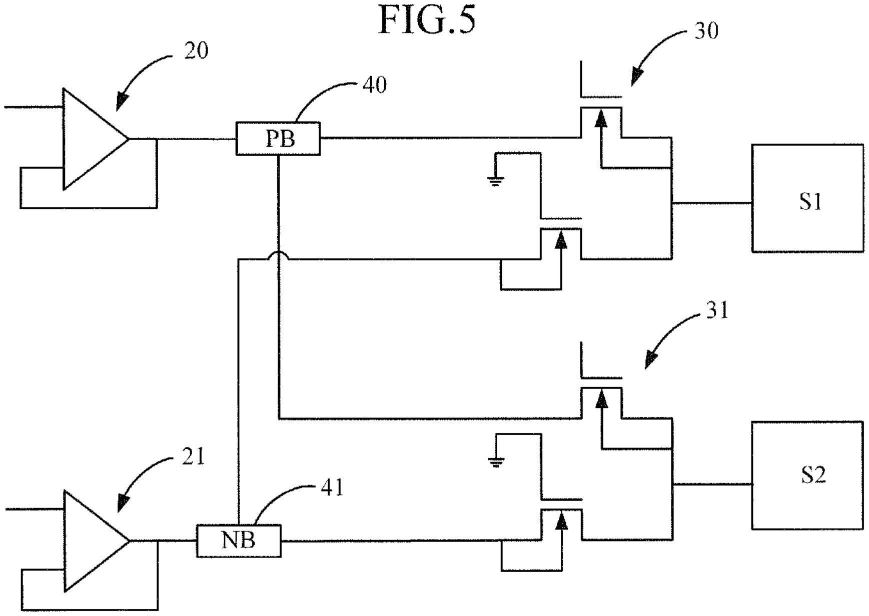
FIG. 6 is a schematic diagram of a driver circuit for dot inversion of liquid crystals, similar to that in FIG. 5, in accordance with a second preferred embodiment of the present invention.

Turning now to FIG. 6, a schematic diagram of a driver circuit for dot inversion of liquid crystals in accordance with a second preferred embodiment of the present invention is shown. Reference numerals of the second embodiment of the present invention have applied the identical numerals of the first embodiment, as shown in FIG. 5. The construction of the driver circuit in accordance with the second embodiment of the present invention has similar configuration and same function as that of the first embodiment and detailed descriptions thereof may be omitted.

Referring to FIG. 6, the driver circuit of the second embodiment of the present invention further includes a first selector circuit 40 and a second selector circuit 41. The selector circuit 40 is consisted of low voltage components and connects with the positive source 20. Correspondingly, the second selector circuit 41 is also consisted of low voltage components and connects with the negative source 21.

With continued reference to FIG. 6, each of the positive source 20 and the negative source 21 has a single operational amplifier such that only two components of the operational amplifiers are provided in the driver circuit of the second embodiment of the present invention.

Referring back to FIGS. 3, 4 and 6, four components of operational amplifiers are provided in the driver circuit, as best shown in FIGS. 3 and 4. Conversely, only two components of the operational amplifiers, as best shown in the left portion in FIG. 6, are provided in the driver circuit of the second embodiment of the present invention which is successful in reducing the number of components.

Figure 7:
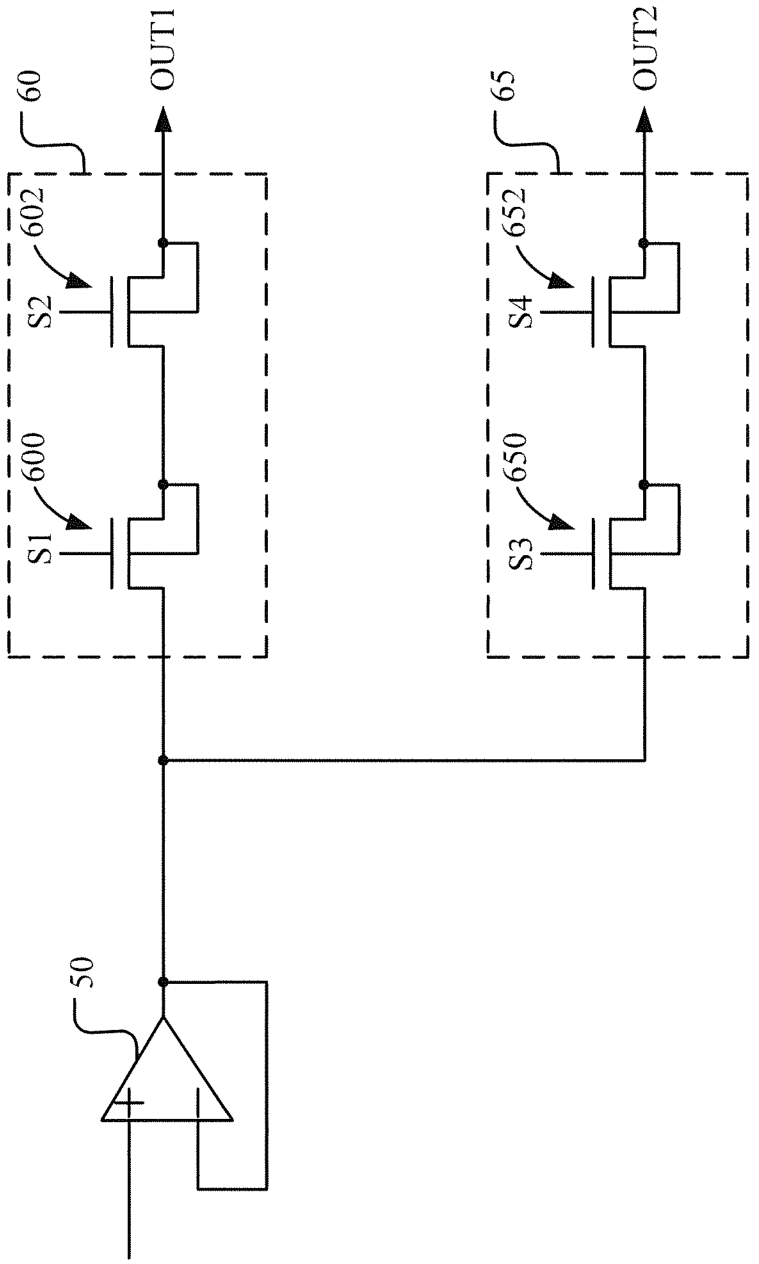
FIG. 7 shows a circuit diagram of the driving circuit of a display panel according to a first embodiment of the present invention.

Please refer to FIG. 7, which shows a circuit diagram of the driving circuit of a display panel according to a first embodiment of the present invention. As shown in the figure, the driving circuit of a display panel according to the present invention comprises a signal generating unit 50 and selecting circuits 60, 65. The signal generating unit 50 is used for generating a polarity signal. The selecting circuit 20 is coupled to the signal generating unit 50 and comprises switches 600, 602, which output the polarity signal to a first output OUT1 according to switching signals S1, S2. The selecting circuit 65 is coupled to the signal generating unit 10 and the selecting circuit 20. The selecting circuit 65 comprises switches 650, 652, which output the polarity signal to a second output OUT2 according to switching signals S3, S4.

Figure 8:
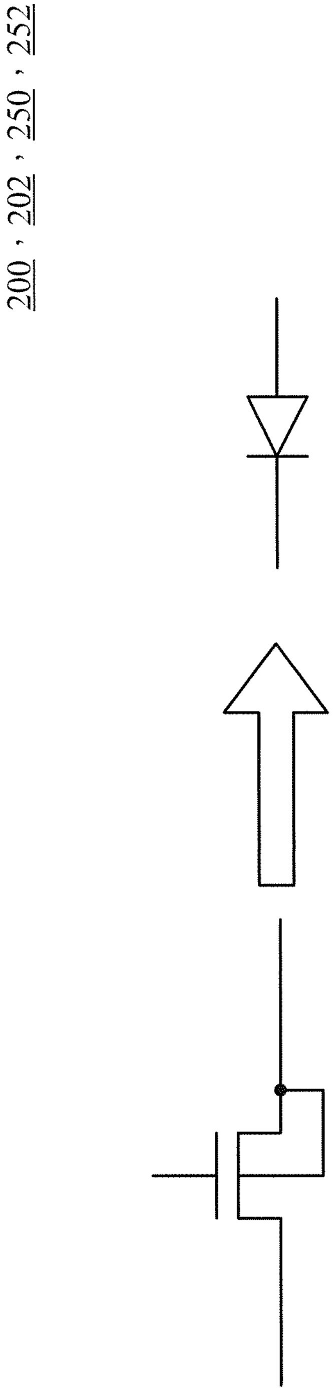
FIG. 8 shows an equivalent circuit diagram of the switch according to the present in the cutoff state.

In addition, please refer to FIG. 8, which shows an equivalent circuit diagram of the switch according to the present in the cutoff state. As shown in the figure, the switches 600, 602, 650, 652 according to the present invention are field-effect transistors. Besides, according to the design of the present invention, the switches 600, 602, 650, 652 are equivalent to diodes when they are in the cutoff state. According to the present embodiment, the cut-off switches 600, 602 or the cut-off switches 650, 652 are equivalent to diodes.

Figure 9A:
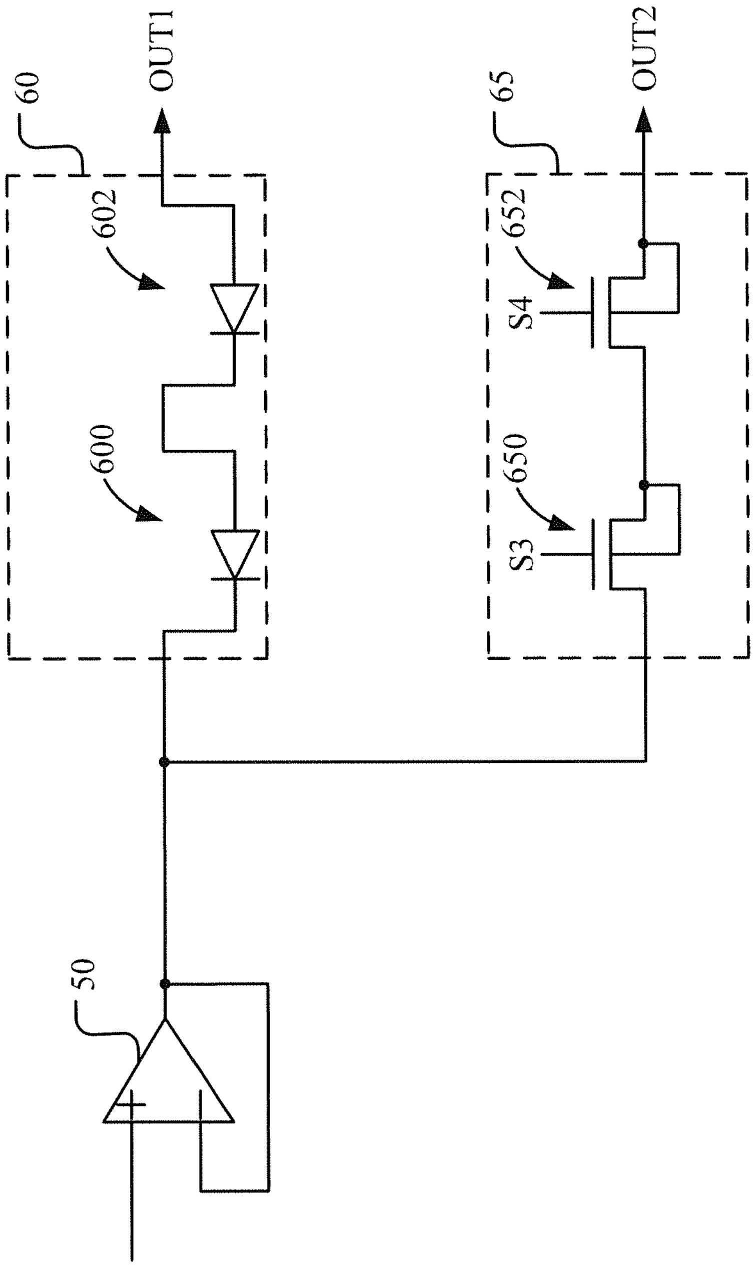
FIG. 9A shows an operational schematic diagram of the driving circuit in FIG. 6 according to the first embodiment of the present invention.

According to the above description, the switches 600, 602 are field-effect transistors. Moreover, a bulk electrode of the switch 600 is coupled to a source electrode of the switch 600; a gate of the switch 600 is used for receiving the switching signal S1; a bulk electrode of the switch 602 is coupled to a source electrode of the switch 602; a gate of the switch 602 is used for receiving the switching signal S2. The switches 600, 602 are turned on or cut off according to the switching signals S1, S2, respectively. Because the bulk electrode of the switch 600 is coupled to the source electrode of the switch 600 (to the right of the switch 600) and the bulk electrode of the switch 602 is coupled to the source electrode of the switch 602 (to the right of the switch 602), when the switches 600, 602 are cut off according to the switching signals S1, S2, respectively, the switches 600, 602 are both equivalent to diodes, as shown in FIG. 9A. Thereby, by taking advantage of the equivalence of the switches 600, 602 to diodes, the voltage differences between the two terminals of the switches 600, 602 according to the present invention can be divided and thus achieving the purposes of saving circuit area and reducing cost.

Figure 9B:
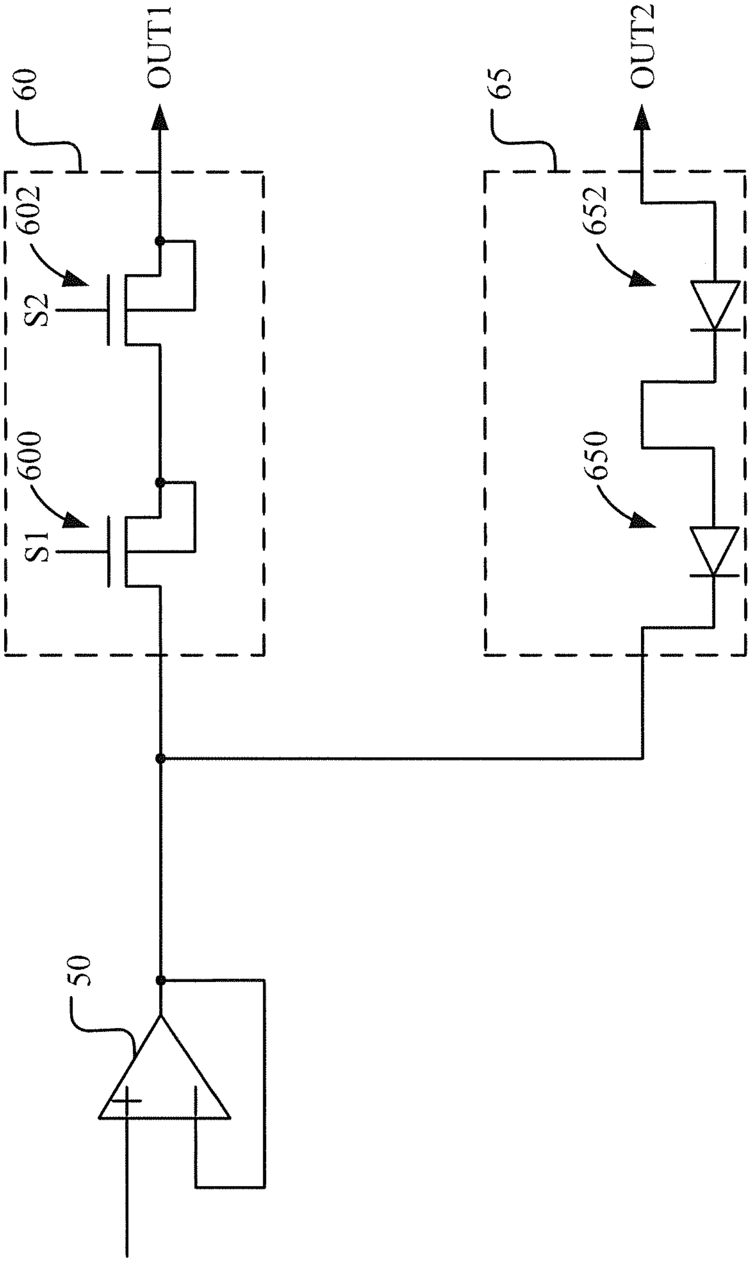
FIG. 9B shows an operational schematic diagram of the driving circuit in FIG. 6 according to the second embodiment of the present invention.

Likewise, because the bulk electrodes of the switches 650, 652 are coupled to their source electrodes, when the switches 650, 652 are cut off according to the switching signals S3, S3, respectively, the switches 650, 652 are both equivalent to diodes, as shown in FIG. 9B. Thereby, by taking advantage of the equivalence of the switches 650, 652 to diodes, the voltage differences between the two terminals of the switches 650, 652 according to the present invention can be divided and thus achieving the purposes of saving circuit area and reducing cost.

Figure 10:
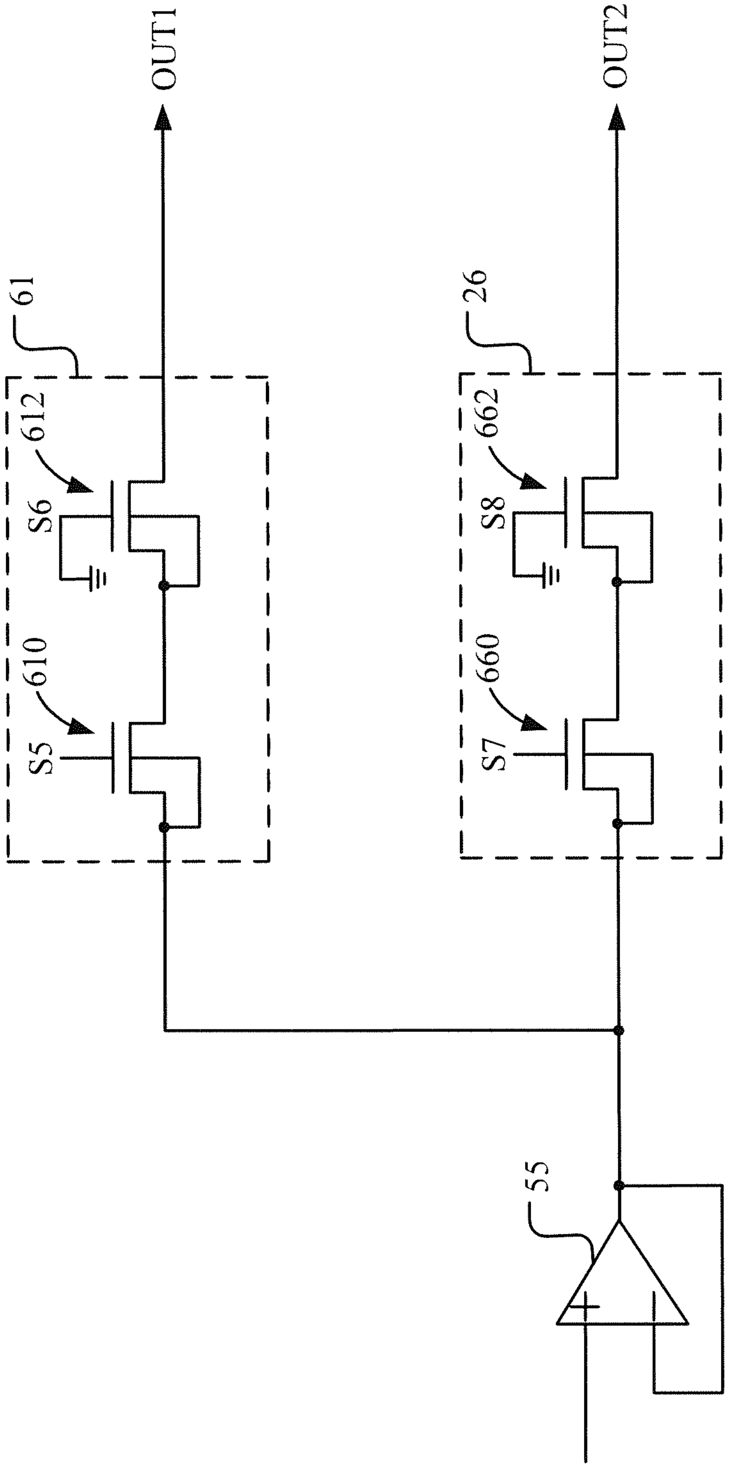
FIG. 10 shows a circuit diagram of the driving circuit of a display panel according to a second embodiment of the present invention.
Figure 11A:
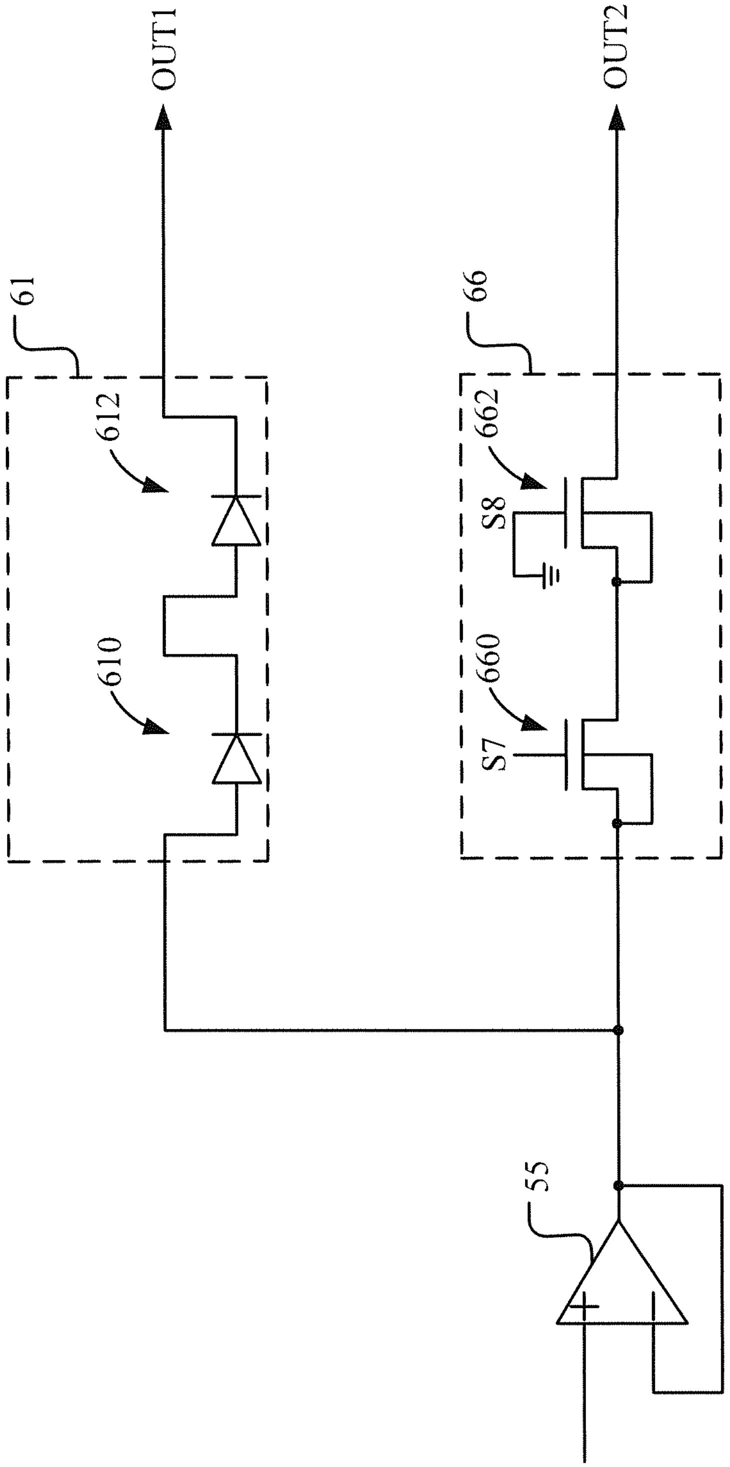
FIG. 11A shows an operational schematic diagram of the driving circuit in FIG. 10 according to the first embodiment of the present invention.
Figure 11B:
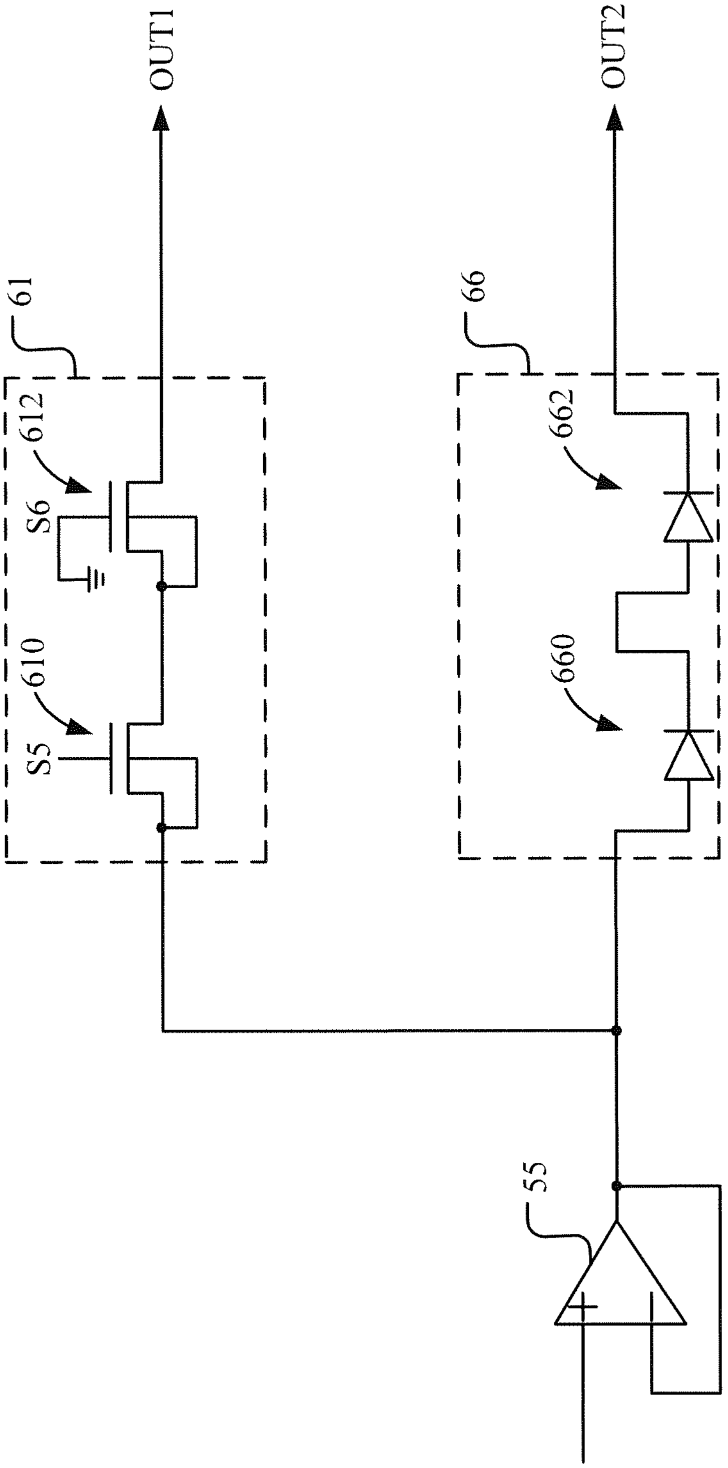
FIG. 11B shows an operational schematic diagram of the driving circuit in FIG. 10 according to the second embodiment of the present invention.

On the other hand, please refer to FIG. 10, which shows a circuit diagram of the driving circuit of a display panel according to a second embodiment of the present invention. As shown in the figure, the difference between the present embodiment and the previous one is that the driving circuit according to the present embodiment is used for providing a negative driving signal. In addition, a selecting circuit 61 according to the present embodiment comprises switches 610, 612 and a selecting circuit 66 according to the present embodiment comprises switches 660, 662. The switches 610, 612, 660, 662 are all field-effect transistors and their bulk electrodes are coupled to their source electrodes (to the left of respective switches), respectively. Thereby, when the switches 610, 612 are cut off according to switching signal S5, S6, the switches 610, 612 are equivalent to diodes, as shown in FIG. 11A. Alternatively, when the switches 660, 662 are cut off according to switching signal S7, S8, the switches 660, 662 are equivalent to diodes, as shown in FIG. 11B. Thereby, by taking advantage of the equivalence of the switches 610, 612 to diodes, the voltage differences between the two terminals of the switches 610, 612 according to the present invention can be divided; or by taking advantage of the equivalence of the switches 660, 662 to diodes, the voltage differences between the two terminals of the switches 660, 662 according to the present invention can be divided. Accordingly, the purposes of saving circuit area and reducing cost can be achieved.

Figure 12:
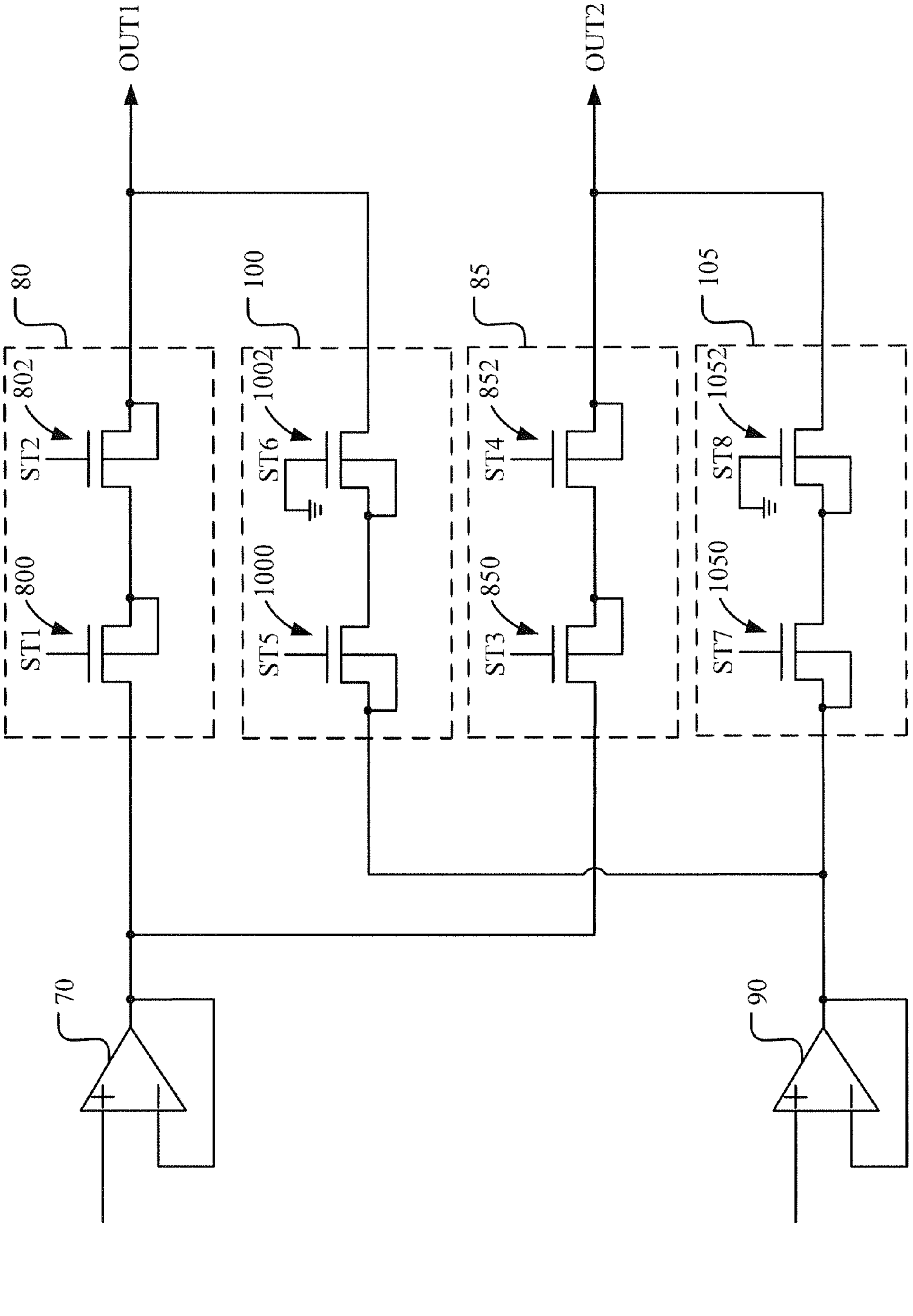
FIG. 12 shows a circuit diagram of the driving circuit of a display panel according to a third embodiment of the present invention.

Please refer to FIG. 12, which shows a circuit diagram of the driving circuit of a display panel according to a third embodiment of the present invention. As shown in the figure, the difference between the present embodiment and the ones in FIGS. 7 and 10 is that, according to the present invention, the driving circuits in FIGS. 7 and 10 are integrated for performing point inversion of liquid crystal. The detailed circuit is described in the following. The driving circuit of a display panel according to the present embodiment comprises a positive signal generating unit 70, positive selecting circuits 80, 85, a negative signal generating circuit 90, negative selecting circuits 100, 105. The positive signal generating unit 70 is used for generating a positive-polarity signal. The positive selecting circuit 80 is coupled to the positive signal generating unit 70 and comprises switches 800, 802, which output the positive-polarity signal to a first output OUT1 according to switching signals ST1, ST2, respectively. The positive selecting circuit 85 is coupled to the positive signal generating unit 30 and the positive selecting circuit 80, and comprises switches 850, 852, which output the positive-polarity signal to a second output OUT2 according to switching signals ST3, ST4, respectively.

The negative signal generating unit 90 is used for generating a negative-polarity signal. The negative selecting circuit 100 is coupled to the negative signal generating unit 90 and comprises switches 1000, 1002, which output the negative-polarity signal to the first output OUT1 according to switching signals ST5, ST6, respectively. The negative selecting circuit 105 is coupled to the negative signal generating unit 50 and the negative selecting circuit 100, and comprises switches 1050, 1052, which output the negative-polarity signal to the second output OUT2 according to switching signals ST7, ST8, respectively. When the switches 800, 802, 850, 852, 1000, 1002, 1050, 1052 are cut off, they are equivalent to diodes.

According to the above description, the present embodiment is applied to the driving circuit for point inversion of liquid crystal in a display panel. Thereby, when the first output OUT1 outputs the positive-polarity signal, the second output OUT2 outputs the negative-polarity signal; when the first output OUT1 outputs the negative-polarity signal, the second output OUT2 outputs the positive-polarity signal. In the following, how to achieve the above results will be described.

Figure 13:
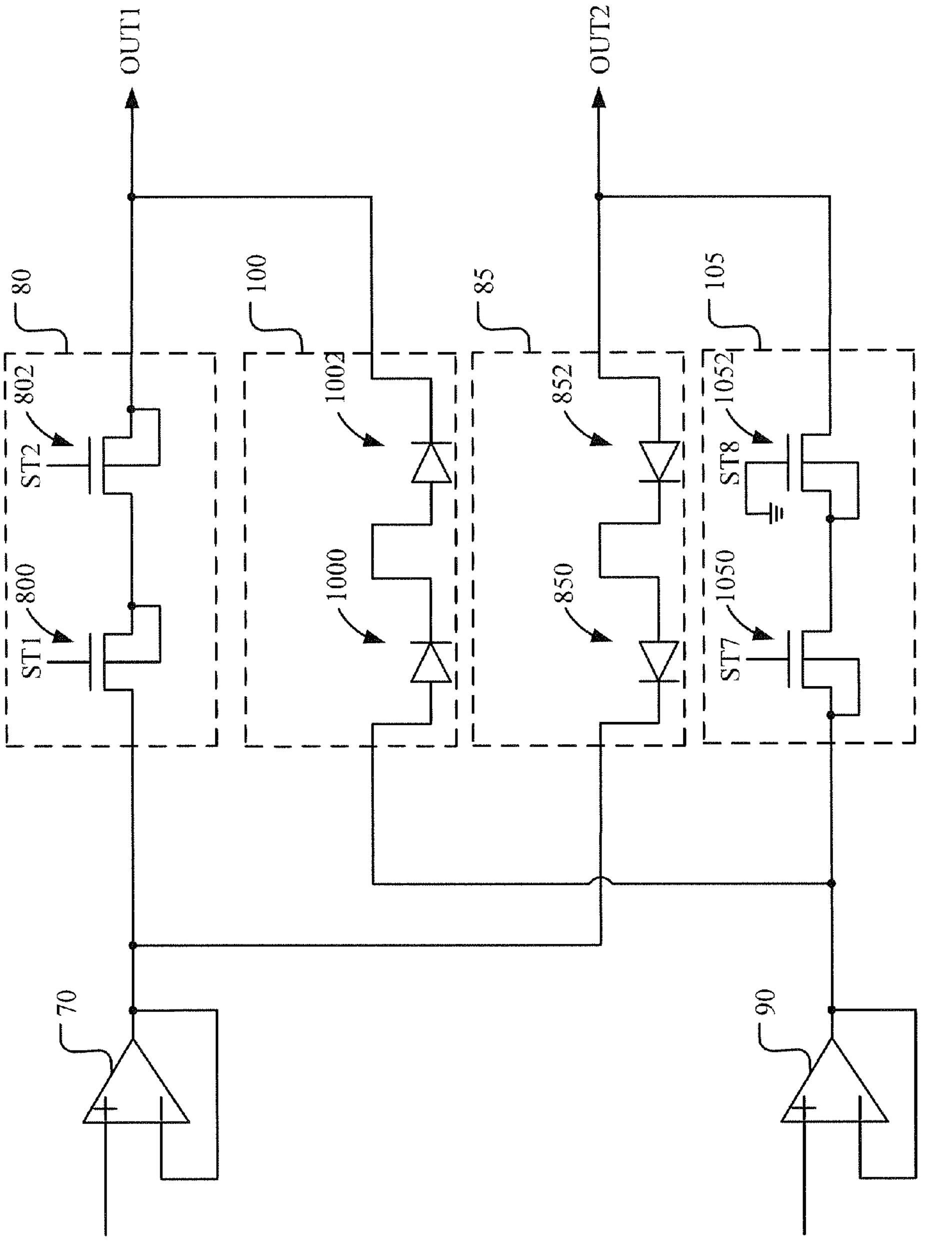
FIG. 13 shows an operational schematic diagram of the driving circuit in FIG. 12 according to the present invention.
Figure 14:
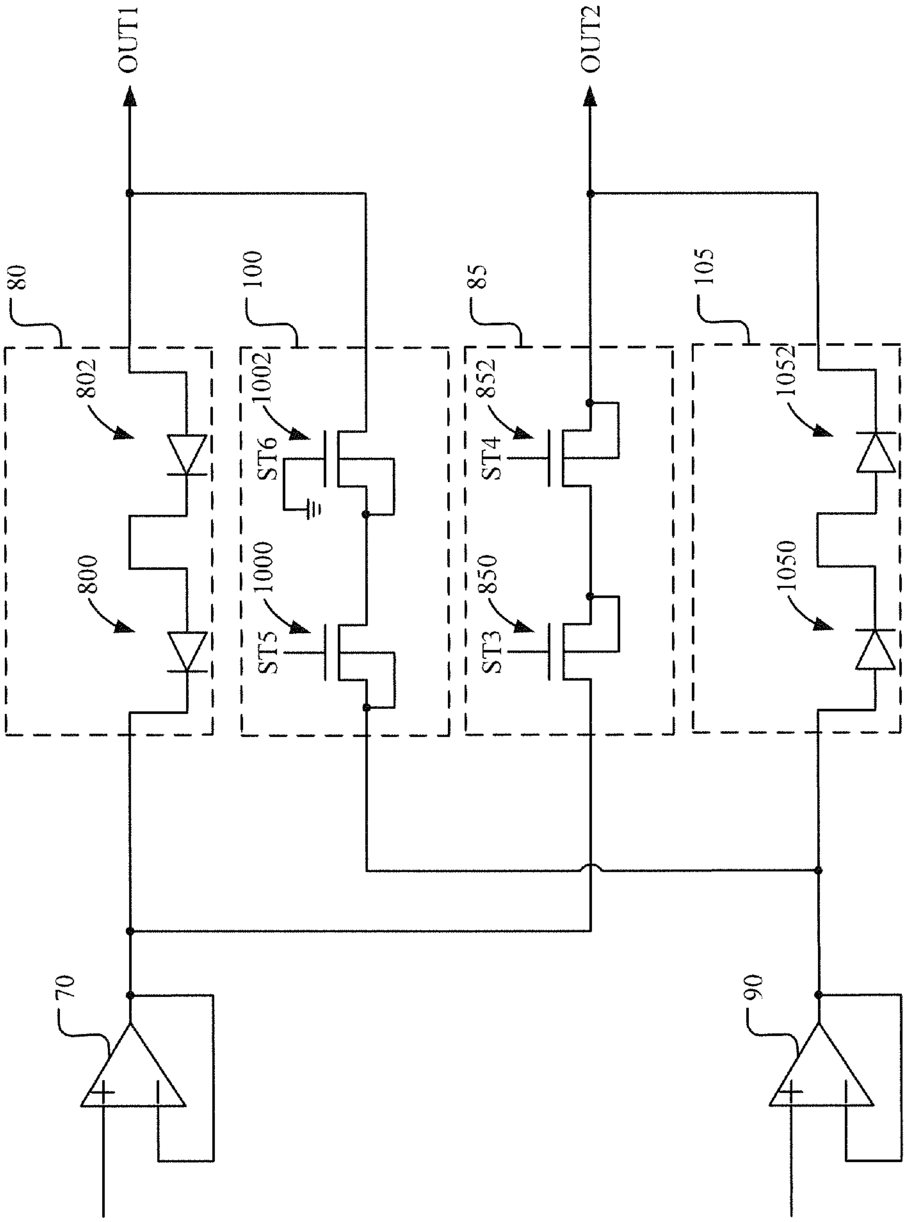
FIG. 14 shows an operational schematic diagram of the driving circuit in FIG. 12 according to the present invention.

When the positive signal generating unit 70 outputs the positive-polarity signal to the first output OUT1 via the switches 800, 802, the positive signal generating unit 70 stops outputting the positive-polarity signal to the second output OUT2 via the switches 850, 852. Meanwhile, the negative signal generating unit 90 outputs the negative-polarity signal to the second output OUT2 via the switches 1050, 1052, and the negative signal generating unit 90 stops outputting the negative-polarity signal to the first output OUT1 via the switches 1000, 1002, as shown in FIG. 13. Alternatively, when the positive signal generating unit 70 outputs the positive-polarity signal to the second output OUT2 via the switches 850, 852, the positive signal generating unit 70 stops outputting the positive-polarity signal to the first output OUT1 via the switches 800, 802. Meanwhile, the negative signal generating unit 90 outputs the negative-polarity signal to the first output OUT1 via the switches 1000, 1002, and the negative signal generating unit 90 stops outputting the negative-polarity signal to the second output OUT2 via the switches 1050, 1052, as shown in FIG. 14. Thereby, when the positive signal generating unit 70 of the driving circuit according to the present embodiment outputs the positive-polarity signal to the first output OUT1, the negative signal generating unit 90 outputs the negative-polarity signal to the second output OUT2; or when the positive signal generating unit 70 outputs the positive-polarity signal to the second output OUT2, the negative signal generating unit 90 outputs the negative-polarity signal to the first output OUT1. Consequently, the driving circuit according to the present embodiment can perform point inversion of liquid crystal.

Besides, the positive signal generating unit 70 will keep outputting the positive-polarity signal to the selecting circuits 80, 85. The amplitude of the positive-polarity signal is generally 0~5V. According to the present embodiment, the amplitude of the positive-polarity signal is 5V. Likewise, the negative signal generating unit 90 will keep outputting the negative-polarity signal to the selecting circuits 100, 105. The amplitude of the negative-polarity signal is generally 0~−5V. According to the present embodiment, the amplitude of the negative-polarity signal is −5V. Based on the above description, when the first output OUT1 changes from 5V to −5V, a terminal of the selecting circuit 80 is 5V while the other terminal thereof is −5V. Thereby, the selecting circuit 70 has to bear 10V at this moment. Consequently, the switches 800, 802 in the selecting circuit 80 have to be high-voltage devices for withstanding 10V, which increases the cost.

For overcoming the problem described above, according to the present invention, the cut-off switches 800, 802 in the selecting circuit 80 are equivalent to diodes. By using the principle of voltage dividing, the voltages across both terminals of the switch 800 and across both terminals of the switch 802 are reduced. Thereby, no high-voltage device is required, and thus achieving the purpose of saving cost. In addition, it is not required to use any switch between the switches 800, 802. In the following, the selecting circuit 800 is described.

Figure 15:
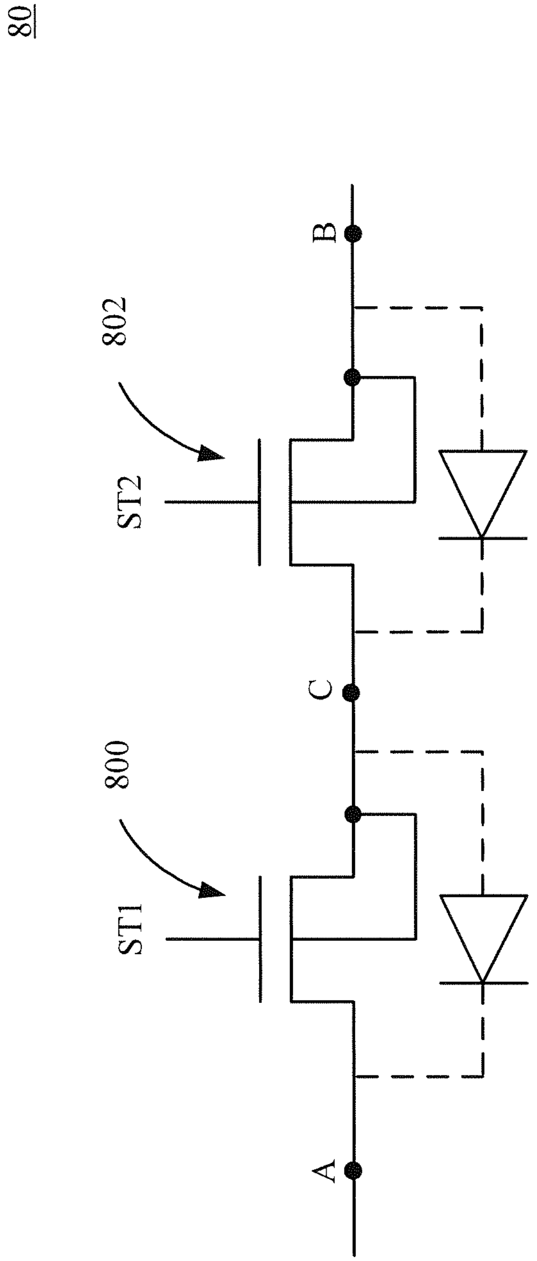
FIG. 15 shows an operational schematic diagram of the selecting circuit in the driving circuit according to the present invention.

Please refer to FIG. 15, which shows an operational schematic diagram of the selecting circuit in the driving circuit according to the present invention. As shown in the figure, the selecting circuit 80 according to the present invention comprises switches 800, 802. The switches 800, 802 according to the present embodiment are both n-type MOSFETs with the same size. The switch 400 is connected in series with the switch 802. The bulk electrode of the switch 400 is coupled to the source electrode; the bulk electrode of the switch 802 is also coupled to the source electrode. The switches 800, 802 according to the present embodiment can be fabricated using the specifications of the 5V n-type MOSFETs provided by TSMC/UMC. In the turn-off state, the gate-oxide breakdown voltage of the n-type MOSFETs according to the specifications is 12V; the junction breakdown voltage of PN junctions is 7V.

The drain electrode of the switch 800 receives the positive-polarity signal output by the positive signal generating unit. In addition, the drain electrode of the switch 800 set as the point A; the first output OUT1 is set as the point B; and the node between the switches 800, 802 is set as the point C. The gate of the switch 800 receives 0V; the gate of the switch 802 receives −5V. Thereby, the switches 800, 802 are in the cutoff state. At this moment, the voltage of the first output OUT (the point B) is −5V and the voltage at the point A is 5V. Because the sizes of the n-type MOSFETs of the switches 800, 802 are identical, when the switches are in the cutoff state, they are equivalent to diodes. Because the sizes of the two diodes are the same, the impedances of the two diodes are the same. Thereby, the voltage at the point C is the sum of the voltages at the points A, B divided by two. In other words, the voltage at the point C is 0V.

According to the above description, the voltage difference $|V_{DS1}|$ between the drain and source electrodes of the switch 800 is 5V; and the voltage difference $|V_{DS2}|$ between the drain and source electrodes of the switch 802 is also 5V. The voltage differences between the drain and source electrodes of the switches 800, 802 are both smaller than 7V, so the PN junctions of the switches 800, 802 will not have voltage breakdown. Furthermore, the voltage difference $|V_{GS1}|$ between the gate and source electrodes of the switch 800 is 0V; and the voltage difference $|V_{GS2}|$ between the gate and source electrodes of the switch 802 is 5V. The voltage differences between the gate and source electrodes of the switches 800, 802 are both smaller than 12V, so the gate oxide layers of the switches 800, 802 will not have oxide breakdown.

In addition, when the voltage of the point A is 5V and the voltage of the point B is 0V, the voltage of the point C is 2.5V. Thereby, the voltage difference $|V_{DS1}|$ between the drain and source electrodes of the switch 400 is 2.5V; and the voltage difference $|V_{DS2}|$ between the drain and source electrodes of the switch 402 is also 2.5V. The voltage differences between the drain and source electrodes of the switches 800, 802 are both smaller than 7V, so the PN junctions of the switches 800, 802 will not have voltage breakdown. Furthermore, the voltage difference $|V_{GS1}|$ between the gate and source electrodes of the switch 800 is 2.5V; and the voltage difference $|V_{GS2}|$ between the gate and source electrodes of the switch 802 is 7.5V. The voltage differences between the gate and source electrodes of the switches 800, 802 are both smaller than 12V, so the gate oxide layers of the switches 800, 802 will not have oxide breakdown.

Moreover, when the voltage of the point A is 0V and the voltage of the point B is −5V, the voltage of the point C is −2.5V. Thereby, the voltage difference $|V_{DS1}|$ between the drain and source electrodes of the switch 800 is 2.5V; and the voltage difference $|V_{DS2}|$ between the drain and source electrodes of the switch 802 is also 2.5V. The voltage differences between the drain and source electrodes of the switches 800, 802 are both smaller than 7V, so the PN junctions of the switches 800, 802 will not have voltage breakdown. Furthermore, the voltage difference $|V_{GS1}|$ between the gate and source electrodes of the switch 800 is 2.5V; and the voltage difference $|V_{GS2}|$ between the gate and source electrodes of the switch 802 is 2.5V. The voltage differences between the gate and source electrodes of the switches 800, 802 are both smaller than 12V, so the gate oxide layers of the switches 800, 802 will not have oxide breakdown.

According to the above description, because the bulk electrodes of the switches 800, 802 according to the present invention are coupled to the source electrodes, the switches 800, 802 are equivalent to diodes in the cutoff state and thus dividing the voltages on both terminals, namely, the points A and B, of the selecting circuit 800. Thereby, no high-voltage device is required; and no extra switching device is required between the switches 800, 802, either. Consequently, the purposes of saving circuit area and reducing cost can be achieved.

Likewise, as shown in FIG. 12, when the selecting circuits 85, 100, 105 are in the cutoff state, the switches in the plurality of selecting circuits 85, 100, 105 are equivalent to diodes. Thereby, no high-voltage device is required; and no extra switching device is required between the two switches in the plurality of selecting circuits 85, 100, 105, either. Consequently, the purposes of saving circuit area and reducing cost can be achieved.

Please refer to FIG. 12 again. The voltage of the switching signal ST6 received by the gate electrode of the switch 1002 in the selecting circuit 100 is 0V. That is to say, the gate electrode of the switch 1002 in the selecting circuit 100 is coupled to the ground directly. Thereby, the switching signal ST6 can be saved, and hence further saving the area of the control circuit for generating the switching signal ST6. Likewise, the voltage of the switching signal ST8 received by the gate electrode of the switch 1052 in the selecting circuit 105 is 0V. In other words, the gate electrode of the switch 1052 in the selecting circuit 105 is coupled to the ground directly.

Figure 16:
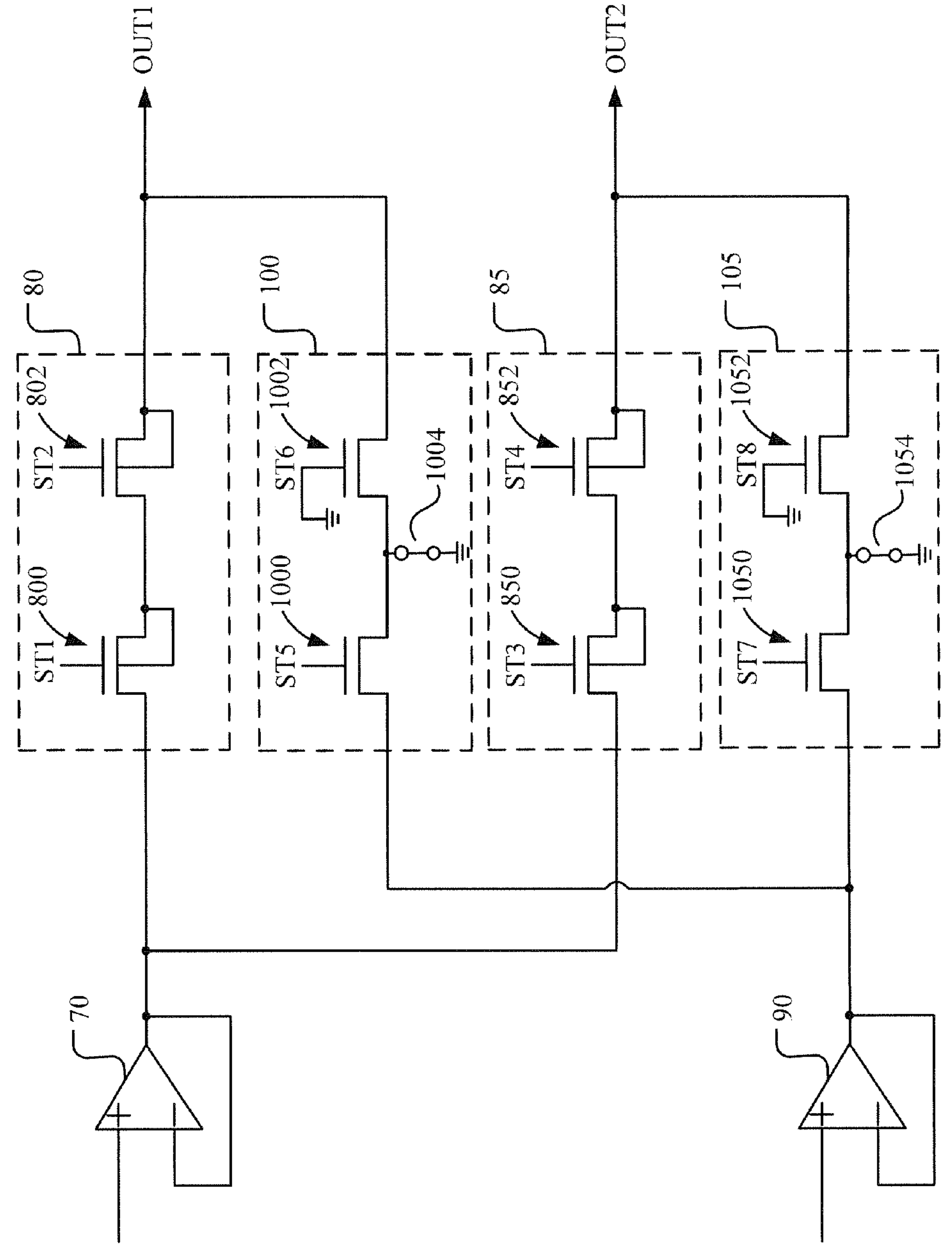
FIG. 16 shows a circuit diagram of the driving circuit of a display panel according to a fourth embodiment of the present invention.

Please refer to FIG. 16, which shows a circuit diagram of the driving circuit of a display panel according to a fourth embodiment of the present invention. As shown in the figure, the difference between the present embodiment and the third embodiment is that the selecting circuits 100, 105 according to the present embodiment further comprise switches 1004, 1054, respectively. A first terminal of the switch 1004 is disposed between the switches 1000, 1002; and a second terminal of the switch 1004 is coupled to the ground. When the switches 1000, 1002 are cut off, the switch 1004 is turned on for reducing the voltages across both terminals of the switches 1000, 1002, and thus avoiding using high-voltage devices in the switches 1000, 1002. Likewise, the switch 1054 is disposed between the switches 1050, 1052 for reducing the voltages across both terminals of the switches 1050, 1052, and thus avoiding using high-voltage devices in the switches 1050, 1052.

Furthermore, the description above is only an embodiment; the present invention is not limited to the embodiment. Alternatively, the switches 1004, 1054 can be disposed between the switches 800, 802 and between the switches 850, 852, respectively. This is well known to a person having ordinary skill in the art. Hence, the details will not be described further.

Although the invention has been described in detail with reference to its presently preferred embodiment(s), it will be understood by one of ordinary skill in the art that various modifications can be made without departing from the spirit and the scope of the invention, as set forth in the appended claims.

The invention claimed is:

1. A driving circuit of a display panel, comprising:

a positive signal generating unit, used for generating a positive-polarity signal;

a first positive selecting circuit, coupled to said positive signal generating unit, comprising a first switch and a second switch, and said first switch and said second switch outputting said positive-polarity signal to a first output according a first switching signal and a second switching signal, respectively;

a second positive selecting circuit, coupled to said positive signal generating unit and said first positive selecting circuit, comprising a third switch and a fourth switch, and said third switch and said fourth switch outputting said positive-polarity signal to a second output according a third switching signal and a fourth switching signal, respectively;

a negative signal generating unit, used for generating a negative-polarity signal;

a first negative selecting circuit, coupled to said negative signal generating unit, comprising a fifth switch and a sixth switch, and said fifth switch and said sixth switch outputting said negative-polarity signal to said first output according a fifth switching signal and a sixth switching signal, respectively; and a second negative selecting circuit, coupled to said negative signal generating unit and said first negative selecting circuit, comprising a seventh switch and an eighth switch, and said seventh switch and said eighth switch outputting said negative-polarity signal to said second output according a seventh switching signal and an eighth switching signal, respectively;

where said first switch and said second switch, said third switch and said fourth switch, said fifth switch and said sixth switch, or said seventh switch and said eighth switch are both equivalent to diodes in the cutoff state, the voltage difference across said first switch and said second switch, said third switch and said fourth switch, said fifth switch and said sixth switch, or said seventh switch and said eighth switch to be divided by the diodes.

2. The driving circuit of claim 1, wherein said first switch, said second switch, said third switch, and said fourth switch are all field-effect transistors with the bulk electrodes coupled to the source electrodes, respectively.

3. The driving circuit of claim 1, wherein said fifth switch, said sixth switch, said seventh switch, and said eighth switch are all field-effect transistors with the bulk electrodes coupled to the source electrodes, respectively.

4. The driving circuit of claim 1, wherein said sixth switching signal and said eighth switching signal are ground signal.

5. The driving circuit of claim 1, wherein the size of said first switch is identical to the size of said second switch; the size of said third switch is identical to the size of said fourth switch; the size of said fifth switch is identical to the size of said sixth switch; and the size of said seventh switch is identical to the size of said eighth switch.

6. The driving circuit of claim 1, wherein when said positive signal generating unit outputs said positive-polarity signal to said first output via said first switch and said second switch, said positive signal generating unit stops outputting said positive-polarity signal to said second output via said third switch and said fourth switch, and concurrently said negative signal generating unit outputs said negative-polarity signal to said second output via said seventh switch and said eighth switch and said negative signal generating unit stops outputting said negative-polarity signal to said first output via said fifth switch and said sixth switch; or when said positive signal generating unit outputs said positive-polarity signal to said first output via said third switch and said fourth switch, said positive signal generating unit stops outputting said positive-polarity signal to said second output via said first switch and said second switch, and concurrently said negative signal generating unit outputs said negative-polarity signal to said first output via said fifth switch and said sixth switch and said negative signal generating unit stops outputting said negative-polarity signal to said second output via said seventh switch and said eighth switch.

7. A driving circuit of a display panel, comprising:

a signal generating unit, used for generating a polarity signal;

a first selecting circuit, coupled to said signal generating unit, comprising a first switch and a second switch, and said first switch and said second switch outputting said polarity signal to a first output according a first switching signal and a second switching signal, respectively;

a second selecting circuit, coupled to said signal generating unit and said first selecting circuit, comprising a third switch and a fourth switch, and said third switch and said fourth switch outputting said polarity signal to a second output according a third switching signal and a fourth switching signal, respectively;

where said first switch and said second switch, or said third switch and said fourth switch are both equivalent to diodes in the cutoff state, the voltage difference across said first switch and said second switch, or said third switch and said fourth switch to be divided by the diodes.

8. The driving circuit of claim 7, wherein said first switch, said second switch, said third switch, and said fourth switch are all field-effect transistors with the bulk electrodes coupled to the source electrodes, respectively.

9. The driving circuit of claim 7, wherein the size of said first switch is identical to the size of said second switch; and the size of said third switch is identical to the size of said fourth switch.

10. The driving circuit of claim 7, wherein when said signal generating unit outputs said polarity signal to said first output via said first switch and said second switch, said signal generating unit stops outputting said polarity signal to said second output via said third switch and said fourth switch; or when said signal generating unit outputs said polarity signal to said first output via said third switch and said fourth switch, said signal generating unit stops outputting said polarity signal to said second output via said first switch and said second switch.

* * * * *